United States Patent [19]

Ridenour

[11] 4,065,052

[45] Dec. 27, 1977

[54] DUAL ACTION CONTROL MECHANISM

[75] Inventor: Michael R. Ridenour, Fremont, Ind.

[73] Assignee: Evans Products Company, Portland, Oreg.

[21] Appl. No.: 738,836

[22] Filed: Nov. 4, 1976

[51] Int. Cl.² .......................................... G05D 23/02
[52] U.S. Cl. ................... 236/86; 123/41.06; 123/41.12; 192/82 T; 236/35.3; 236/84
[58] Field of Search ............. 236/35.3, 86, 84, 101 A; 192/82 T; 123/41.04, 41.06, 41.12

[56] References Cited

U.S. PATENT DOCUMENTS

| | | | |
|---|---|---|---|
| 1,410,361 | 3/1922 | Blackmore | 192/82 T X |
| 2,661,148 | 12/1953 | Englander | 236/86 X |
| 2,996,079 | 8/1961 | Mahand et al. | 236/86 X |
| 3,226,025 | 12/1965 | Ferris | 236/35 |
| 3,759,056 | 9/1973 | Graber | 236/35.3 X |
| 3,955,760 | 5/1976 | Ridenour et al. | 236/86 |

Primary Examiner—William E. Wayner
Assistant Examiner—William E. Tapolcai, Jr.
Attorney, Agent, or Firm—Robert E. Howard

[57] ABSTRACT

A thermostatically operated dual action control mechanism for controlling fluid actuatable devices such as the shutter and the fan clutch in the cooling system of a diesel engine in vehicles. A valve rod is provided and movable between first and second positions. A hollow passageway is provided in the valve rod, and in one position of the valve rod is open to allow fluid to flow through to one of two exhaust ports in the valve housing to actuate one of the devices. In the other position, the passageway is closed off by a reciprocating needle valve. A thermally responsive sensor element actuates the valve rod between the first and second positions thereof. A limit switch is provided and actuated by the needle valve in the second position of the valve rod and opens up a solenoid valve to allow fluid to flow to the other device.

3 Claims, 3 Drawing Figures

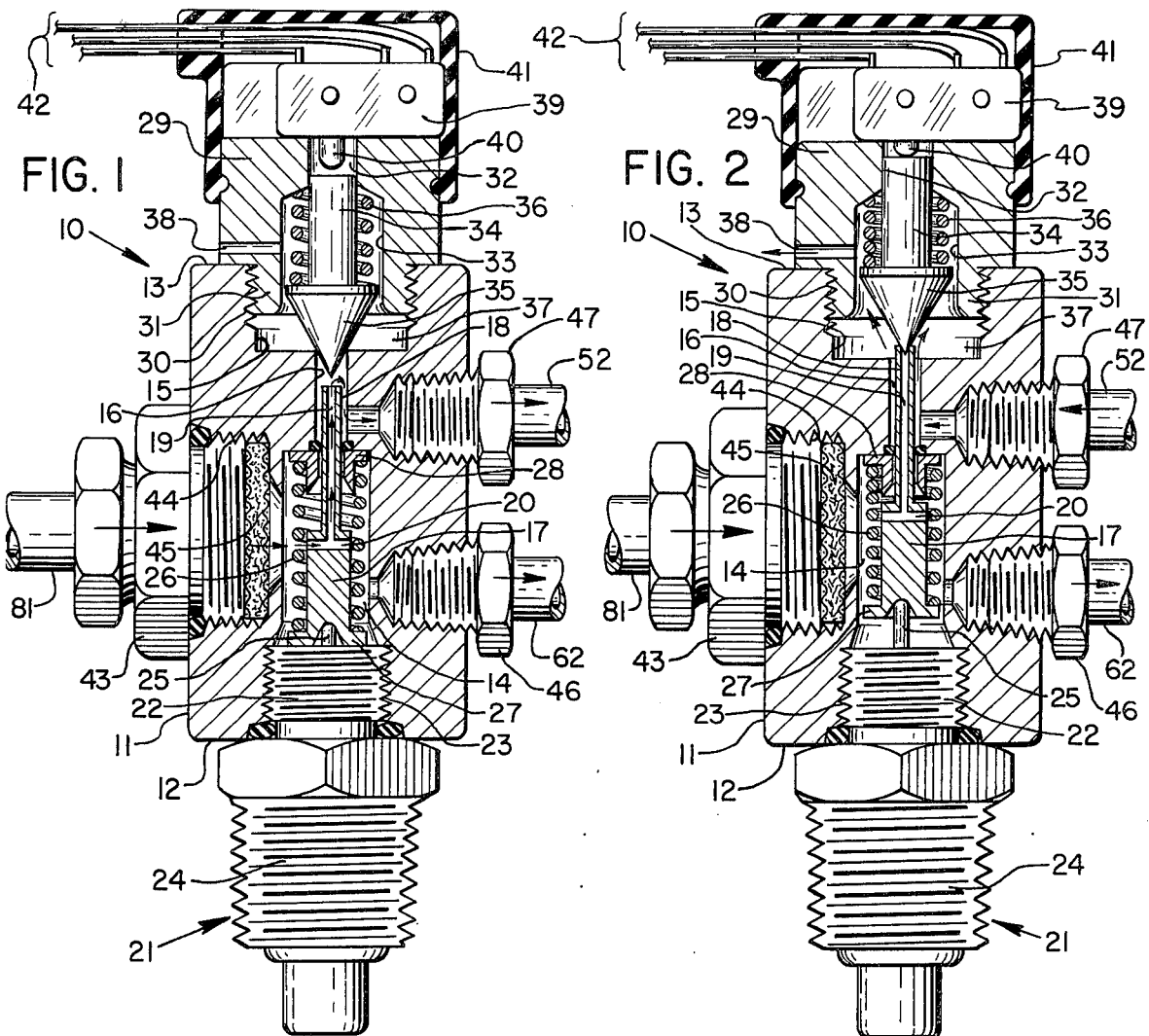
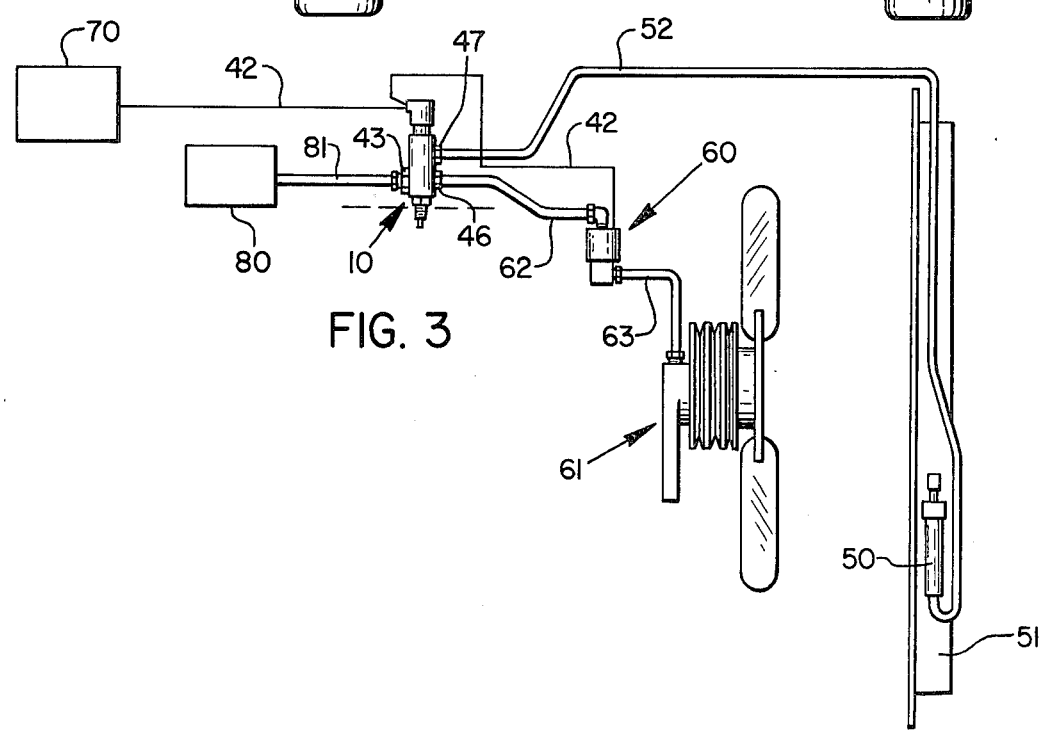

DUAL ACTION CONTROL MECHANISM

BACKGROUND OF THE INVENTION

The present invention relates to a mechanism for controlling the flow of fluid from a source of fluid under pressure to fluid actuatable devices. More particularly, the present invention relates to a mechanism for controlling the cooling of internal combustion engines, particularly vehicular diesel engines.

As is well known in the art, diesel engines operate best within prescribed elevated temperature limits. Both overheating and under-cooling such engines in undesirable for optimum operation.

In the past, one method of effecting appropriate cooling of such engines has been the use of shutters placed in front of the radiators servicing the engine. See, for example, U.S. Pat. No. 3,046,619. Upon reaching the upper limit of the optimum operating temperature range, the shutters are opened in response to thermostatically operated control valves, thereby exposing the radiator to ram air from the outside. Conversely, upon the engine temperature reaching the appropriate lower temperature, the thermostatically operated control valve actuates the shutter to close the communication of the radiator with cooling air. See U.S. Pat. No. 3,955,760 for an example of one such control valve.

Another type of device for controlling the cooling of such engines are fan clutches. In such devices the fan is activated and deactivated in response to a thermostatically operated valve mechanism. Illustrative of such devices is that shown in U.S. Pat. No. 3,253,687.

It has also been suggested to use both types of cooling devices; i.e., both shutters and fan clutches for effecting the cooling of such engines. One such device is described in U.S. Pat. No. 3,226,025. However, the control mechanism of the latter patent actuates the two devices by electrical means which are relatively complicated and therefore prone to failure in operation.

It is an object of the present invention to provide a dual action thermostatic control mechanism which will operate both a fan clutch and a shutter from a single relatively simple control mechanism which will not allow the fan clutch to operate with the shutter closed.

SUMMARY OF THE INVENTION

The present invention relates to a thermally sensitive control mechanism which controls two fluid actuatable devices such as a shutter mechanism and a fan clutch in the cooling system of an internal combustion engine. The design of the control mechanism of the present invention is such as to insure that the fan clutch is never actuated unless the shutter is in an open position.

The control mechanism comprises a valve body having a valve chamber located therein, an air delivery opening in the valve body for communicating a source of compressed air with the valve chamber, a thermal sensor having a push rod extending therefrom into said valve chamber at the inner end thereof, a reciprocal valve rod located in the valve chamber having an axial passageway therein communicating the valve chamber with an exhaust chamber located at the outer end of the valve body, the push rod of the thermal sensor being in constant contact with the inner end of said reciprocal valve rod, a cylindrical housing having an axial bore located at the outer end of the valve body, the bore having a needle valve located therein with a conical end portion thereof extending into the connecting passageway between the valve chamber and the exhaust chamber at a first position of the valve rod, the axial bore of the cylindrical housing communicating with the atmosphere through a periphally located passageway, a first air passageway communicating the valve chamber with a first air actuatable device such as an air operated fan clutch drive mechanism, a second air passageway communicating the connecting passageway with a second air actuatable device such as an air cylinder actuating a shutter, and a limit switch located at the outer end of the cylindrical housing having an actuating pin extending into the bore of said cylindrical housing in a position such that at the second position of the valve stem wherein the push pin of the thermal sensor is fully extended, the outer end of the needle valve member, which is opposite the conical end, is in actuating contact therewith.

During normal operating conditions, air enters the control mechanism through a peripherally located inlet port on the valve body, enters the valve chamber, passes from the valve chamber through the axial opening in the valve rod stem and exits from the second air passageway to the air cylinder which, under pressurization, keeps the shutter closed. Air also passes from the valve chamber through the first air passageway to the fan clutch drive mechanism. However, the air does not operate the fan clutch until the limit switch actuates a solenoid air valve permitting passage of air from the first air passageway to the fan clutch drive mechanism. The latter does not occur until the valve rod moves from its first position permitting air to flow to the cylinder closing the shutter to its second or outer position which permits communication between the second air passageway and the exhaust chamber, thereby exhausting the air from the cylinder holding the shutter in a closed position and permitting it to open by the action of spring means acting thereon.

DESCRIPTION OF PREFERRED EMBODIMENT

Reference is made to the drawing for an understanding of the preferred embodiment of the present invention.

In the drawing,

FIG. 1 is a cross-section of the thermostatically operated control valve mechanism of the present invention with the components thereof shown in a position they occupy at a temperature below the actuation temperature of the thermal sensor; and FIG. 2 is a similar cross-sectional view of the control mechanism showing the components in the position they occupy above the activation temperature of the control mechanism; and FIG. 3 is a schematic showing the general relationship between the control mechanism and the fan clutch and shutter assemblies controlled thereby.

Referring now to FIGS. 1 and 2, the thermostatically controlled valve mechanism 10 of the present invention is illustrated in cross-section. The mechanism 10 comprises a generally cylindrical valve body 11 having an inner end 12 and an outer end 13. A valve chamber 14 is located axially within valve body 11. Bore 15 is machined axially into the outer end 13 of valve body 11. Connecting passageway 16 communicates valve chamber 14 with bore 15.

Located within valve chamber 14 is a valve rod 17 having a valve stem 18. Valve stem 18 has an axial opening or bore 19 running along its entire longitudinal length. Axial opening 19 of valve stem 18 communicates with valve chamber 14 via at least one peripherally located port 20 on valve rod 17.

A thermally responsive sensor element 21 is affixed to the inner end 12 of valve body 11 by screwing the externally threaded stem portion 22 thereof into the bored and tapped opening 23 of valve body 11. The exposed portion 24 of sensor element 21 is externally threaded to enable it to be screwed into an appropriate place on an engine block or radiator of an internal combustion engine. A push pin 25 extends from neck portion 22 of sensor element 21 into valve chamber 14 and into contact with the inner end of valve rod 17. Valve rod 17 is urged into constant contact with push pin 25 by virtue of spring member 26 pushing against collar 27 of valve rod 17 at the inner end thereof and against collar 28 at the outer end thereof. Sensor element 21 is filled with a material which is thermally expansable and, upon expansion, urges push pin 25 in an outward direction. This action pushes valve rod 17 outwardly in a manner and for a purpose to be described.

Located on the outer end 13 of valve body 11 is a cylindrical housing 29. Cylindrical housing 29 is secured to valve body 11 by a suitable threads 30 located on the external portion of neck 31 of cylindrical housing 29, which said threads are received by the internally threaded outer portion of bore 15. Cylindrical housing 29 has an axial bore 32 having an enlarged portion 33.

A needle valve member 34 having an enlarged conical head portion 35 is located within bore 32 and its enlarged portion 33. Needle valve 34 is urged inwardly by spring member 36 to a position such, that under the nonactivated conditions illustrated in FIG. 1, the conical head portion 35 of needle valve 34 fits into the outer end of connecting passageway 16 and seals communication thereof with an exhaust chamber 37 formed by bore 15 and enlarged portion 33 of axial bore 32. Exhaust chamber 37 communicates with the atmosphere via peripheral exhaust port 38, the largest circumferential portion of conical head 35 being slightly smaller than the inner circumferential measurement of enlarged portion 33 of bore 32 to thereby permit air to pass thereabout.

Located at the outer end of cylindrical housing 29 is a limit switch 39 having a pin or plunger 40 extending therefrom into axial bore 32 of body member 29. A flexible cap member 41 covers the outer end of housing 29. Wiring 42 extends through suitable openings in the periphery of flexible cap 41 and connect limit switch 39 to solenoid valve 60 of fan clutch 61 and a suitable power source 70.

Air supply connection member 43 connects valve mechanism 10 with an air source 80 via air line 81. Air passes from the air source or supply 80 into the air supply passageway 44 and thence through filter 45 into valve chamber 14.

A first air passageway 46 communicates valve chamber 14 with solenoid valve 60 via connecting air line 62 (shown in FIG. 3).

A second air passageway 47 communicates connecting passageway 16 with air cylinder 50 of shutter mechanism 51 via air line 52, as illustrated in FIG. 3.

The operation of the control valve mechanism will now be described. FIG. 1 illustrates the control mechanism under engine temperature conditions such that the engine does not require cooling air flowing through the radiator. In this mode of operation, air from air supply 80 enters valve chamber 14 of control mechanism 10 via air supply passageway 44. The direction of air flow is shown by arrows in the FIG. 1. Air from valve chamber 14 passes through first air passageway 46 to solenoid valve 60 via connecting air line 62. In this mode of operation solenoid valve 60 is in a closed position and does not permit air to flow therethrough to fan clutch 61 via air line 63.

In addition, air passes from valve chamber 14 through peripherally located inlet port 20 in valve rod 17, through axial opening or bore 19 in the valve stem 18, exits from the outer terminus of axial bore 19 into connecting passageway 16, is blocked from entry into exhaust chamber 37 by virtue of the fact that conical head portion 35 of needle valve member 34 is seated in the outward end thereof in sealing relationship, passes around the outer periphery of valve stem 18 due to the fact that valve stem 18 has a slightly smaller diameter than connecting passageway 16, and out second air passageway 47 to cylinder 50 of shutter mechanism 51. Air cylinder 50 retains the shutters in a closed position against the action of spring members (not shown) tending to urge the shutters to an open position.

If the engine becomes heated to the point where cooling is required, the thermally expansable material contained in thermally responsive sensor element 21 expands thereby forcing pin 25 outwardly. This outward thrust of pin 25 overcomes the action of spring member 26 and forces valve rod 17 and associated valve stem 18 in an outward direction. As valve rod 17 and associated valve stem 18 move outwardly, contact is eventually made with the conical head portion 35 of needle valve 34. At a certain point, the tip of conical head portion 35 is received within the terminal end of axial opening 19 of valve stem 18, and needle valve 34 is urged outwardly against the action of spring member 36. As conical head portion 35 is unseated from sealing relationship with the outer end of connecting passageway 16, it simultaneously is in a sealing relationship to the terminal end of axial bore 19 of valve stem 18. Thus, air can no longer flow from valve chamber 14 through bore 19. Similarly, since conical head portion 35 is now unseated from sealed relationship with the outer end of connecting passageway 16, communication is established between air cylinder 50 of shutter mechanism 51 and exhaust chamber 37. As this occurs, the air pressure in air cylinder 50 holding the shutter in a closed position escapes to the atmosphere from exhaust chamber 37 via exhaust port 38. At this point, the shutter is thrown by its spring mechanism into an open position and ram air passes through the radiator thereby effecting engine cooling.

In the event that the engine continues to heat, the outward thrust of pin 25 will continue and needle valve 34 will be further thrust outwardly against the action spring member 36 until it contacts plunger 40 of limit switch 39. Upon sufficient depression of plunger 40, limit switch 39 is actuated, connecting a power source 70 with solenoid valve 60 via wiring 42. When this occurs, solenoid valve 60 is opened and air may pass through air line 63 to fan clutch 61 thereby activating the fan clutch into operation. The fan clutch augments the ram air flow, thereby effecting additional cooling. FIG. 2 illustrates the position of the elements in control mechanism 10 in the mode of operation just described.

Upon cooling of the engine, thermally expansable material contained in sensor 21 contracts thereby permitting the action of spring members 36 and 26 to return the elements of the control mechanism 10 back through the sequence of operations in the reverse order previously described.

While the dual action control mechanism described in the foregoing preferred embodiment has been illustrated as being useful in supplying air under pressure to two air actuatable devices, it is clear that the mechanism described may also be used to supply other gases or liquids, generically "fluids," to fluid actuatable devices. In addition, the control mechanism is, while described as controlling the action of a shutter mechanism and a fan clutch, may be used in controlling any fluid actuatable device or devices in response to temperature changes.

I claim:

1. A dual action control mechanism for supplying fluid under pressure to a first and a second fluid actuatable device comprising:
   a. a valve body having an inner end and an outer end;
   b. a valve chamber located within said valve body;
   c. an opening in said valve body for communicating a ource of fluid under pressure with said valve chamber;
   d. an exhaust chamber located at the outer end of said valve body;
   e. a connecting passageway communicating the valve chamber with the exhaust chamber;
   f. a reciprocal valve rod located within said valve chamber, which said valve rod is reciprocally movable from a first position adjacent the inner end of said valve chamber to a second position removed from said inner end, a portion of said valve rod extending into said connecting passageway and having a passageway therein communicating said valve chamber with said connecting passageway in the first position of said valve rod;
   g. a thermal sensor located at the inner end of said valve body, said thermal sensor having a push pin extending into the valve chamber and into contact with the inner end of said valve rod, said valve rod being in its first position when said push pin is unextended and in its second position when said push pin is fully extended;
   h. a housing member located at the outer end of said valve body, said housing member having a bore communicating with said exhaust chamber, a reciprocal needle valve located and movable within said bore, said needle valve having a conical head portion at its inner end extending through said exhaust chamber into sealing relationship with the connecting passageway at the first position of said valve rod and into sealing relationship with the passageway of that portion of the valve rod extending into said connecting passageway at said second position of said valve rod, the bore of said housing member communicating with the atmosphere through a peripherally located exhaust port;
   i. a first fluid passageway for communicating the valve chamber with a first fluid actuatable device via a solenoid valve;
   j. a second fluid passageway for communicating the connecting passageway with a second fluid actuatable device; and
   k. a limit switch located at the outer end of said housing member having an actuating pin extending into the bore of the housing member in a position such that at the second position of said valve rod the outer end of said needle valve is in actuating contact with said actuating pin, said limit switch being connected to said solenoid valve for controlling the flow of fluid through said first fluid passageway to said first fluid actuatable device.

2. The control mechanism of claim 1 wherein that portion of the valve rod extending into said connecting passageway is a stem having a diameter that is sufficiently smaller than the diameter of said connecting passageway to permit fluid to flow therebetween.

3. The control mechanism of claim 1 wherein the diameter of the base of the conical head portion of said needle valve is sufficiently smaller than the diameter of the bore of said housing member to permit fluid to flow therebetween.

* * * * *